United States Patent
Turnquist et al.

(10) Patent No.: US 8,430,628 B2
(45) Date of Patent: Apr. 30, 2013

(54) PRESSURE BALANCED LOW-FRICTION SEAL

(75) Inventors: Norman Arnold Turnquist, Sloansville, NY (US); Keith Michael Parker, Greer, SC (US); Xiaoqing Zheng, Niskayuna, NY (US); Rodrigo Rodriguez Erdmenger, München (DE); Robbert Christiaan Pannekeet, Munich (DE); Alexander Kimberley Simpson, München (DE); Biao Fang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 717 days.

(21) Appl. No.: 12/630,886

(22) Filed: Dec. 4, 2009

(65) Prior Publication Data

US 2011/0135445 A1 Jun. 9, 2011

(51) Int. Cl.
*F01D 11/00* (2006.01)

(52) U.S. Cl.
USPC .............. 415/170.1; 415/171.1; 415/174.5; 415/229; 415/230; 415/231

(58) Field of Classification Search .............. 415/170.1, 415/171.1, 174.5, 229, 230, 231; 277/399, 277/400, 401, 544, 542, 546, 547, 552
See application file for complete search history.

(56) References Cited

U.S. PATENT DOCUMENTS

| | | | | |
|---|---|---|---|---|
| 2,012,956 | A | * | 9/1935 | Chaffin .......................... 277/474 |
| 3,047,299 | A | * | 7/1962 | Olav .............................. 277/422 |
| 3,081,097 | A | * | 3/1963 | Dison et al. .................... 277/358 |
| 3,575,424 | A | | 4/1971 | Taschenberg |
| 3,743,303 | A | * | 7/1973 | Pope ............................. 277/422 |
| 4,082,296 | A | * | 4/1978 | Stein ............................. 277/400 |
| 4,813,692 | A | | 3/1989 | Halling et al. |
| 5,137,284 | A | | 8/1992 | Holder |
| 5,145,189 | A | * | 9/1992 | Pope ............................. 277/544 |
| 5,344,160 | A | * | 9/1994 | Scarlata et al. ............ 415/168.2 |
| 6,367,806 | B1 | | 4/2002 | Turnquist et al. |
| 2007/0069475 | A1 | | 3/2007 | Adis et al. |
| 2008/0224414 | A1 | | 9/2008 | Zheng et al. |

FOREIGN PATENT DOCUMENTS

GB 2430988 A 11/2007

* cited by examiner

*Primary Examiner* — Igor Kershteyn
(74) *Attorney, Agent, or Firm* — Ann M. Agosti (57) ABSTRACT

A pressure balance seal includes a sealing surface facing an inward radial direction, and a stator interface comprising at least one surface interfacing with a stator. The pressure balance seal further includes a friction reducing feature. The friction reducing feature includes a cavity on the sealing surface. The cavity is configured to receive a fluid such that a normal force acting on the pressure balance seal is counterbalanced by a force generated by a pressure of the fluid.

23 Claims, 4 Drawing Sheets

PRESSURE BALANCED LOW-FRICTION SEAL

BACKGROUND

The invention relates generally to the field of seals and more particularly, to systems and methods for achieving pressure balanced seals between elements having relative motion, including axial motion.

Piston rings have been widely used in gas turbine engines between a piston with axial movement and a stationary chamber to prevent leakage from a section with high pressure into a section of low pressure. This same pressure acts to urge the ring against the piston and cause frictional loading. Since, during the start up process of a gas or steam turbine, varying pressure levels may be present, the resultant pressure acting on the piston ring can vary to a great extent. As the pressure increases, the resultant friction between the piston ring and the piston increases.

There is, therefore, a need to develop more effective techniques to reduce friction between elements having relative axial motion in turbines.

BRIEF DESCRIPTION

According to an embodiment of the present invention, a pressure balance seal is provided. The pressure balance seal includes a sealing surface facing an inward radial direction, and a stator interface comprising at least one surface interfacing with a stator. The pressure balance seal further includes a friction reducing feature. The friction reducing feature includes a cavity on the sealing surface. The cavity is configured to receive a fluid, such that a normal force acting on the pressure balance seal is counterbalanced by a force generated by a pressure of the fluid.

In one embodiment, the pressure balance seal is incorporated in a steam turbine.

According to another embodiment, a method for assembling a large turbine comprising a stator, a rotor, and a non-contact face seal assembly is provided. The method for assembling the turbine includes providing a pressure balance seal comprising at least a first seal element and a second seal element. Next, the at least one seal element is positioned within an annular gap within the stator assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
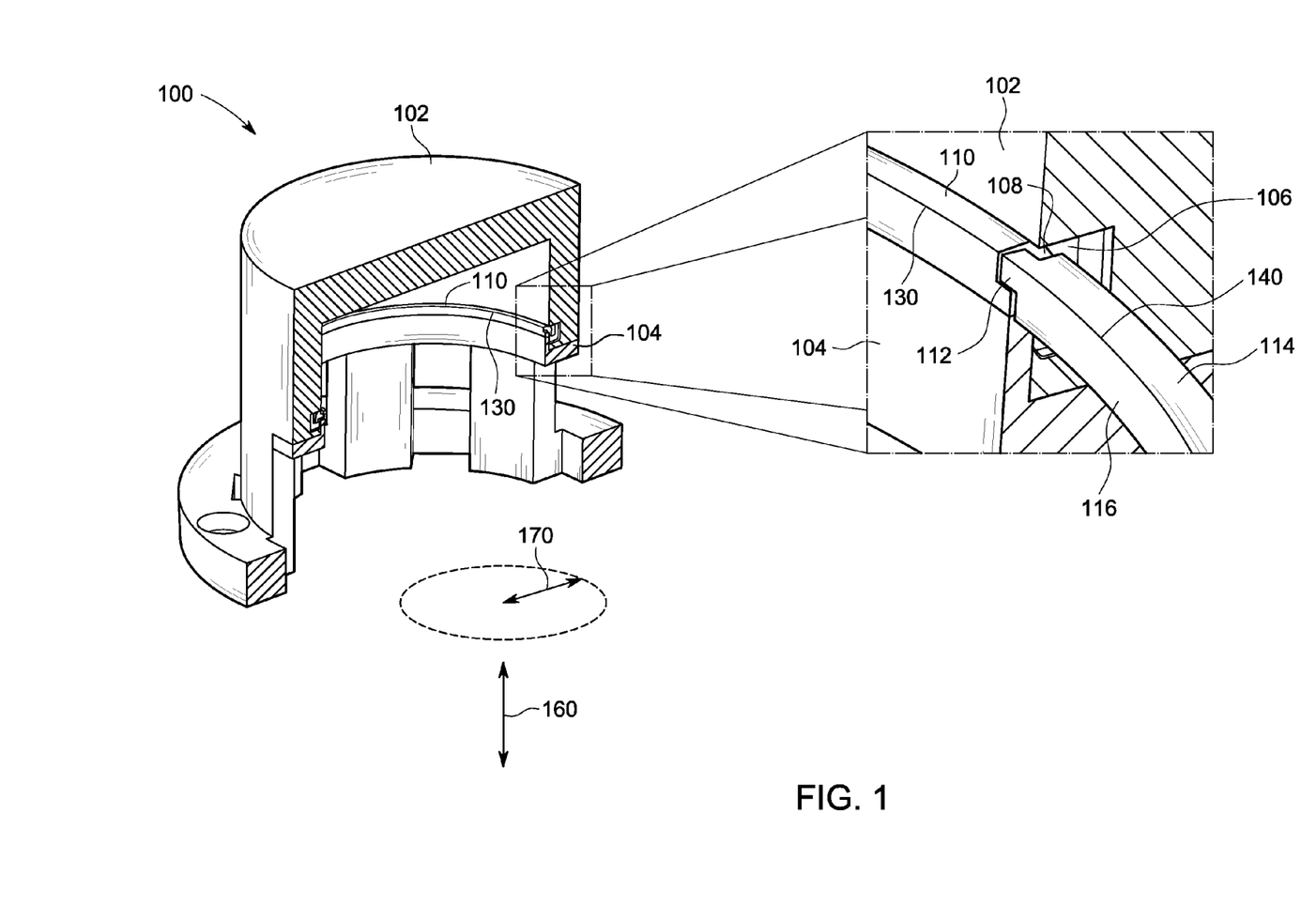
FIG. 1 illustrates a fragmentary perspective view, and a magnified view of a portion, of a seal assembly embodying one aspect of the present invention.
Figure 2:
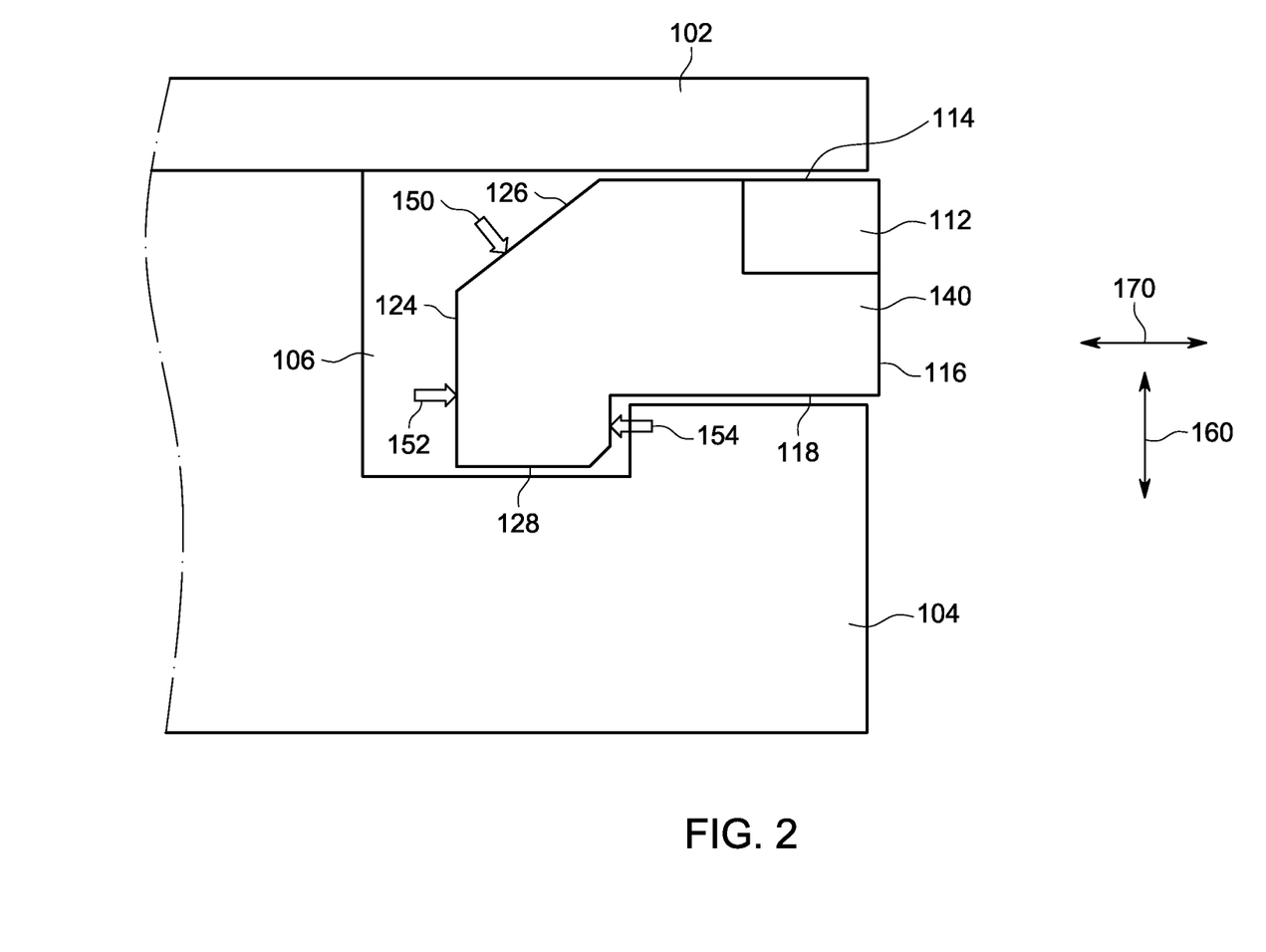
FIG. 2 is a side view of a pressure balance seal within an angular cavity of the seal assembly of FIG. 1.

FIG. 1 is a fragmentary cross-sectional view of a seal assembly 100, usable, for example, in a steam turbine, embodying an aspect of the present invention. FIG. 1 illustrates a first stator element 102 and a second stator element 104 of a stator, an annular gap 106 between the stator elements 102, 104, and a secondary pressure balance seal 110 positioned at least partially within the annular gap 106. The illustrated stator elements 102, 104 define a cylindrical volume for movement of a piston (not shown) along an axial direction 160. The radial direction is illustrated in FIG. 1 by numeral 170. The pressure balance seal 110, which according to certain embodiments is a piston ring 110, is configured to provide a seal between at least two cavities of steam (or air) at differing pressures within the steam turbine. According to one embodiment, the high pressure region in steam turbines may typically contain air and/or steam at temperatures of about 1200° F., and pressure differentials typically up to 1800 psi and sometimes as high as 3000 psi. Those skilled in the art will appreciate that the temperatures and pressure differentials will vary with different turbine applications. The piston ring 110 includes a sealing interface comprising a sealing surface 116 and a stator interface comprising multiple surfaces that interface with the stator, for example, including the stator elements 102, 104. In the illustration of FIG. 1 and FIG. 2, for example, the stator interface includes a back surface 124 substantively opposite the sealing surface 116, a first surface 114 interfacing substantively with the first stator element 102 and a second surface 118 interfacing substantively with the second stator element 104. The stator interface refers to all the surfaces of the pressure balance seal 110 interfacing with the stator or stator elements 102, 104. The stator (only a portion of which is shown in the figures) may comprise an integral one piece stator or may comprise two pieces (as shown in FIGS. 1 and 2) or may comprise more than two pieces). The stator elements 102, 104 are marked distinctly merely to identify the annular gap 106 in which the pressure balance seal 110 resides. Accordingly, in one embodiment, the stator elements 102, 104 belong to a single piece of a stator. According to other embodiments, the stator elements 102, 104 belong to a distinct pieces of a multi-piece stator, for example, as illustrated in the FIG. 1, the first and second stator elements 102, 104 belong to a first and second piece of a two piece rotor, respectively.

Further, in the illustrated example, the piston ring 110 or the pressure balance seal 110 is split into substantially equal, first and second semi-circular seal elements 130 and 140 respectively, providing a half-split piston ring. The half-split piston ring 110 includes the first seal element 130 extending over the second seal element 140 by means of a pre-designed overlap 112. The pre-designed overlap 112 reduces leakage between the two seal elements 130 and 140, as illustrated in FIG. 1, for example, by a closely matched overlap profile along the sealing surface 116 of the piston ring 110. The pressure balance seal 110 ring may further include at least one anti-rotation feature, for example, a retainer slot 108. According to an embodiment, the retainer slot 108 is a space within the predesigned overlap 112 along the back surface 124 that interlocks with a protrusion (not shown) from the stator (or one of the stator elements 102, 104), and arrests a relative circular motion of the piston ring 110 within the annular cavity 106. It is appreciated here that unless stated otherwise, the concepts discussed with respect to the seal element 140 apply in general to the pressure balance seal 110 (including the seal element 130), and vice versa. It is also appreciated here that while a half-split pressure balance seal 110 is illustrated, the invention may also include seals with more than two seal elements, or a full ring seal segmented, for example, at least once along the circumference of the full ring.

Referring now to FIG. 2, a front view of the seal element 140 positioned within the annular cavity 106 is illustrated. The seal element 140 includes a profile created on the edge of the first surface 114 and the back surface 124, for example a chamfer 126. According to one of the operational advantages, the chamfer 126 serves to avoid interference or interlocking between the seal element 140 and the stator components (including, for example, first and second stator elements 102, 104). The seal element 140 further includes a projection 128 extending normally from the second surface 118. The projection 128, according to several embodiments, extends throughout the length of the seal element 140, as illustrated, for example by FIG. 3. The projection 128 is operational to prevent the seal element 140 from dislodging from the annular cavity 140, for example, in an inward radial direction. The chamfer 126 and the projection 128 are also operational in preventing twisting of the pressure balance seal 110. For example, the chamfer 126 (illustrated in FIG. 2 as being positioned at the top left of the seal 110 cross section) and the projection 128 (illustrated in FIG. 2, projected from the bottom left of the seal 110 cross section) may be configurable to be positioned differently than illustrated by FIG. 2. In an alternate embodiment, the chamfer 126 and the projection 128 are configured sequentially along the bottom left of the pressure balance seal 110 cross section. Advantageously, the chamfer 126 and the projection 128 may be positioned to adjust the center of gravity of the cross section of the pressure balance seal 110 (or the seal element 140) such that the distance between a point on which a resultant force acts on the pressure balance seal 110 and the center of gravity of the cross section of the pressure balance seal 110 is reduced. Reducing the distance reduces the possibility of the seal element 140 twisting within the annular gap 106.

FIG. 2 further illustrates an example of a pressure profile developed within the annular cavity 106 around the pressure balance seal element 110, for example, by the fluid within the turbine that is pressurized during operation of the turbine (e.g. steam turbine), such that various forces act on the stator interface surfaces, including the back surface 124, the chamfer 126, and the projection 128. FIG. 2 further illustrates an example of the forces 150, 152 and 154 developed by the fluid pressure within the annular cavity 106, on to the stator interface of the seal element 140. The maximum thickness of the piston ring 110 and the corresponding groove dimension are chosen to provide small, but finite, clearances. This limits the axial movement of the piston ring 110 relative to the annular gap 106 and any twisting or distortion of the piston ring 110 cross section under the combined effects of the axial motion of the piston and the cyclic pressures. It is noted here that the illustrated figures are not to scale, and certain aspects or features may be exaggerated for clarity of illustration. For example, the clearance distances between surfaces 114 and the first stator element 102, and/or the second surface 118 (or the projection 128) and the second stator element 118 are enlarged for ease of viewing in FIG. 2.

Further, in operation, the fluid pressure on the sealing surface 116 of the seal element 140 (and the pressure balance seal 110, in general) is generally less than the fluid pressure within the annular cavity 106 acting on the seal element 140. A resultant normal force urges the seal element 140 in an inward radial direction, pressing the seal element against a piston movable in an axial direction (not shown in the figures). Such a normal force increases friction between the seal element 140 and the piston interfacing with the sealing surface 116.

Figure 3:
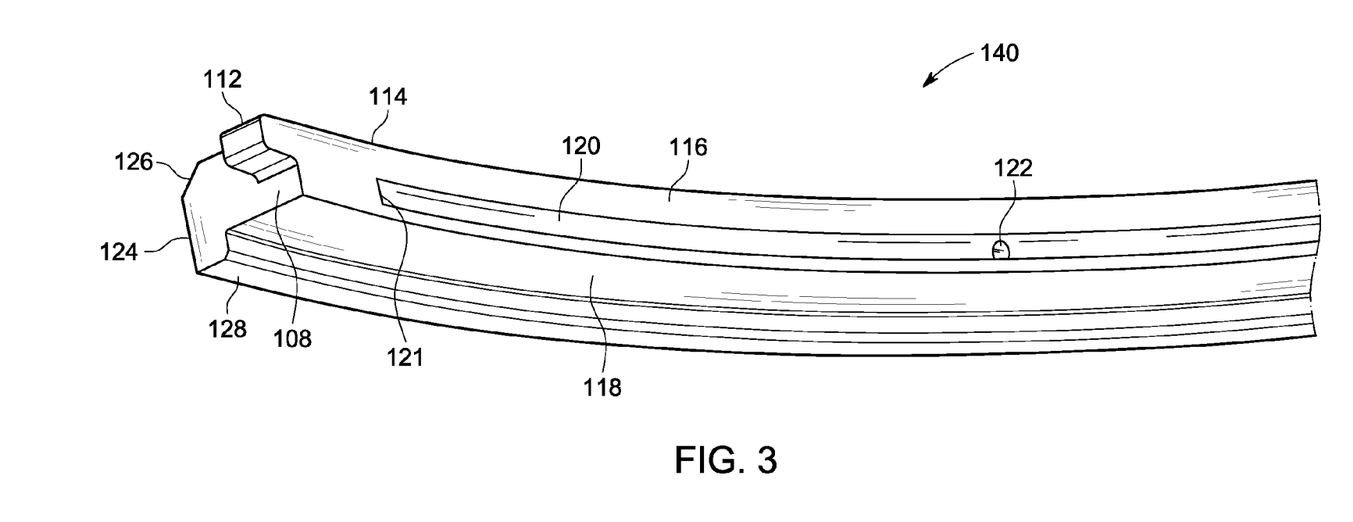
FIG. 3 is a fragmentary front view of the pressure balance seal of FIG. 1.

Referring now to FIG. 3, a fragmentary view of the seal element 140 of the pressure balance seal 110 of FIG. 1 embodying an aspect of the present invention is illustrated. The seal element 140 is configured to reside within the annular gap 106 (FIG. 1) between the first stator element 102 and the second stator element 104 illustrated in FIG. 1. In operation, a high pressure exists (or is developed within) in the annular gap 106, between the seal elements 130, 140 and the stator (including the first and second stator elements 102, 104). The high pressure is generated due to the fluid (e.g. steam or air) within the region between the stator interface of the pressure balance seal 110 and the stator. The sealing surface 116 typically experiences fluid at a comparatively lower pressure, resulting in a net normal force on the pressure balance seal 110. The normal force acts on the pressure balance seal 110 in an inward radial direction, increasing friction between the pressure balance seal 110 and the piston. According to an advantageous aspect of the invention, a friction reducing feature 120 comprises a cavity 120 (e.g. a groove) on the sealing surface 116 for receiving a fluid, such that the normal force acting on the seal element 140 is counterbalanced by a pressure of the fluid in the cavity 120. In a more specific embodiment, as shown in FIG. 3, the cavity 120 comprises a closed groove on the sealing surface 116 of either of the seal elements 130, 140 including a start point 121 and an end point (not shown) similar to the start point 121 within the sealing surface 116 of the seal element 140 of FIG. 3. That is, the groove 120 does not continue across split seal elements, for example, the split seal elements 130 and 140 of FIG. 1. Therefore, in operation, the groove 120 defines a closed (or substantially closed) cavity on the sealing surface 116 with the piston surface, except for openings (a hole or a notch) as provided advantageously by the disclosed embodiments, and discussed hereinafter. Put differently, the cavity 120 is surrounded by a continuous boundary of the sealing surface 116. The continuous boundary enclosing the cavity 120 along the sealing surface 120, is in contact with the piston surface during operation, except for openings as provided advantageously by disclosed embodiments (e.g. a notch).

In the embodiment illustrated by FIG. 3, the friction reducing feature 120 further includes a through-hole, also referred to as a hole 122, extending from the cavity 120 on the sealing surface 116, to at least one of the surfaces of the stator interface of the pressure balance seal 110. The hole 122 provides a path between the higher pressure region and the groove 120 at the seal/piston interface, for example, the sealing surface 116. As discussed, except for the hole 122, in operation according to one embodiment, the groove 120 provides a substantially closed cavity at the sealing surface 116 with the piston in position proximate to the sealing surface 116.

Figure 5:
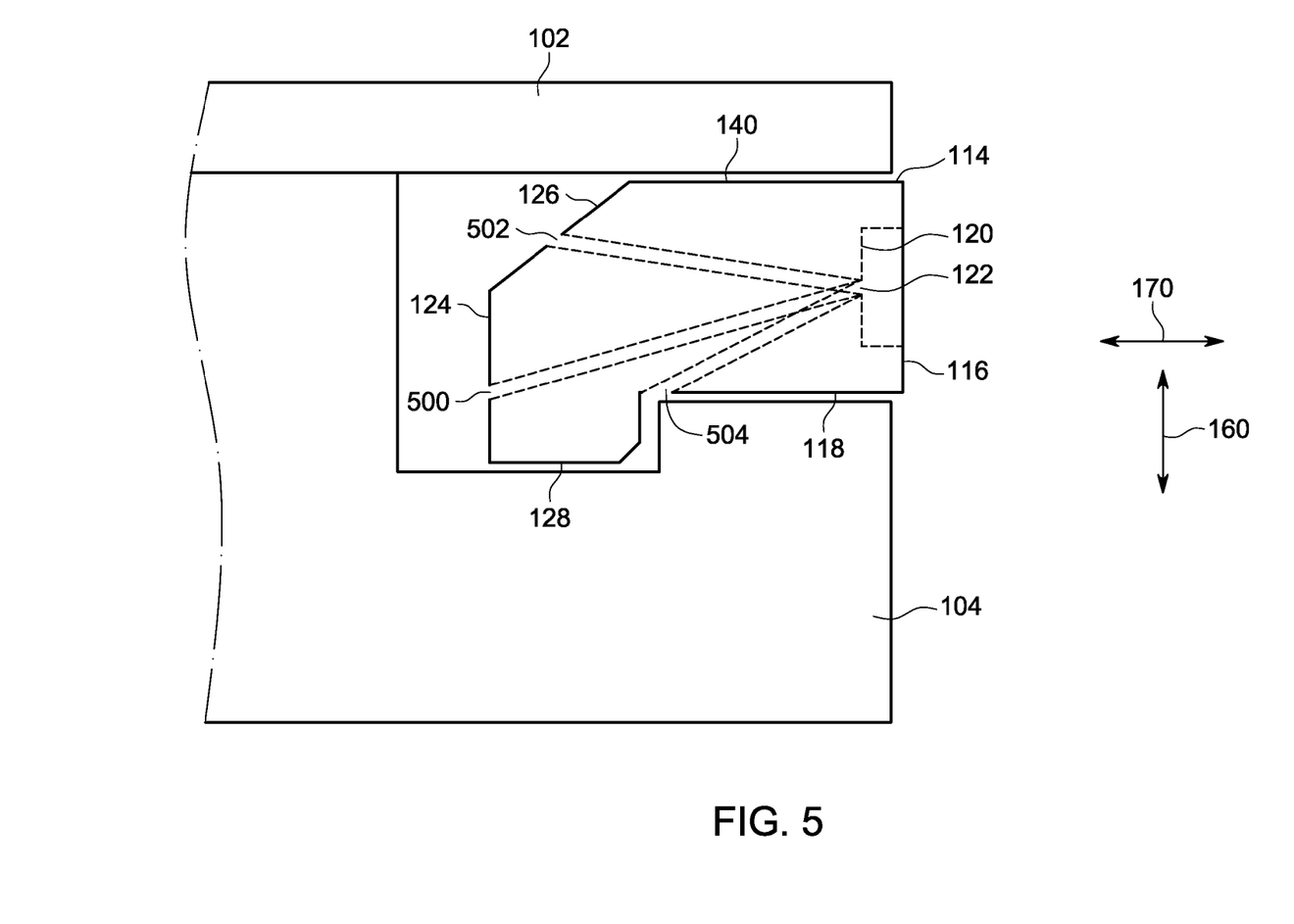
FIG. 5 is a side view of a pressure balance seal illustrating through-hole configurations of the pressure balance seal, in accordance with several aspects of the present invention.

In the embodiment illustrated by FIG. 3, the hole 122 extends from the cavity of the friction reducing feature 120 on the sealing surface 116 to the back surface 124 of the seal element 140. The friction reducing feature 120 permits the otherwise sealed high pressure fluid proximate to the back surface 124 to move to the lower pressure region adjacent to the sealing surface 116, and more specifically to the cavity 120. Consequently, the pressure in the region adjacent to the sealing surface 116 increases, resulting in a force acting in an outward radial direction on the seal element 140, and thereby reducing (or counterbalancing) the net normal force acting on the seal element 140. The reduction in the net normal force on the seal element 140 reduces friction between the seal element 140 and the piston. FIG. 5 illustrates, according to an embodiment, the hole 122 extends through to the back surface 124, emerging as a hole 500. According to another embodiment, the hole 122 extends through between the cavity 120 and the second surface 118, emerging at the second surface 118 as a hole 504. In yet another embodiment, the hole 122 extends through to the chamfer 126, and emerges as a hole 502. It is appreciated here that the hole 122 serves to provide a path between regions of varying pressure proximate to the pressure balance seal 110, and accordingly, the hole 122 is not limited to the through hole configurations illustrated by FIGS. 3 and 5. It is further appreciated here that the term "counterbalance" refers to a reduction in a net force of the pressure balance seal 110 by introducing forces in opposite (counter) directions, and does not necessarily imply (unless stated otherwise) a complete balancing out, or nullification of forces, such that the net force is zero.

Figure 4:
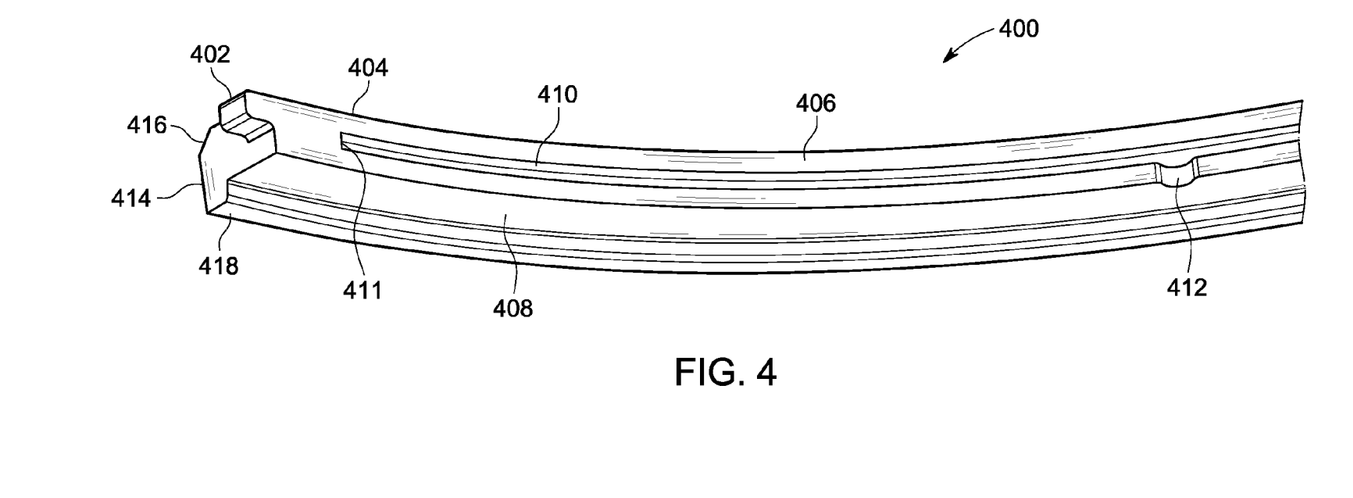
FIG. 4 is a fragmentary view of a pressure balance seal embodying another aspect of the present invention.

FIG. 4 illustrates a fragmentary view of a seal element 400 embodying another aspect of the present invention. The seal element 400 comprises a sealing surface 406, a stator interface including a first surface 404, a second surface 408 and a back surface 414, among other features. The seal element 400 also comprises a friction reducing feature 410 providing a cavity 410 (e.g. a groove) on the sealing surface 406 of the seal element 400. The groove 410 includes a start point 411 and an end point (not shown) within the sealing surface 406 of the seal element 400. The friction reducing feature 410 further includes at least one notch 412 to provide a leakage path for fluid between high pressure and low pressure regions proximate to the seal element 400. Specifically, FIG. 4 illustrates the notch 412 providing a leakage path between at least two otherwise substantively sealed regions, that include the region proximate to the sealing surface 406 and the region proximate to a second surface 408. According to various embodiments, the notch 412 is a channel created along the surface of the seal element 400. In the illustrated embodiment, the notch 412 is a channel created on the sealing surface 406 of the seal element 400 to create a pathway for a fluid from the second surface 408 to the sealing surface 406. The friction reducing feature 410 comprising the notch 412 permits the high pressure fluid proximate to the second surface 408 to move to the lower pressure region adjacent to the sealing surface 406, and more specifically, to the cavity 410. Consequently, the pressure in the region adjacent to the sealing surface 406 increases, resulting in a force acting in an outward radial direction on the seal element 400, and thereby reducing the net normal force acting on the seal element 400. The reduction in the net normal force on the seal element 400 reduces friction between the seal element 400 and a piston movable in an axial direction. As discussed, except for the notch 412, in operation, the groove 410 provides a substantially closed cavity at the sealing surface 406 with the piston in position proximate to the sealing surface 406.

The friction reducing feature as discussed with respect to FIGS. 3 and 4 physically maintains a pressure compensation mechanism by maintaining a dynamic balance of pressure between the high-pressure region and the low-pressure region proximate to the seal element 140 (or 400). Further, throughout the circumference of the seal element 140, multiple radial through-holes, similar to the hole 122 of FIG. 3 passing through a mid-plane of the seal element 140 may be used to communicate the mean pressure in the leakage path between high-pressure region within the annular gap 106 and the low-pressure region at the sealing surface 116. Similarly, throughout the circumference of the seal element 140, multiple notches, similar to the notch 412 of FIG. 4 may be used to communicate the mean pressure in the leakage path between high-pressure region within the annular gap 106 and the low-pressure region at the sealing surface 406. Furthermore, if desired, notches and holes may be used together with a given seal element.

Referring again to FIGS. 2 and 3, the chamfer 126 advantageously provides an improved pressure balance of the pressure balance seal 110 in the axial direction. The first surface 114 engages with first stator element 102 to form a secondary sealing face. In operation, a pressure drop exists across the first surface 114, in an inward radial direction, from an upstream to a downstream pressure. The chamfer 126 serves to reduce the radial length of first surface 114, and thereby reduces the area of the first surface 116 that is subject to a lower pressure. Due to the presence of the chamfer 126, as illustrated, for example, an improved pressure balance of the pressure balance seal (or the piston ring) 110, in an axial direction is achieved, such that the force urging first surface 114 of the piston ring 110 towards the first stator element 102 is reduced. This improvement of axial pressure balance of the piston ring 110 reduces a friction force in a radial direction on the first surface 114, and allows the piston ring 140 to move in the radial direction, for example, within the annular cavity 106, comparatively freely. A reduced resistance to radial movement of the piston ring 110 reduces forces acting on the sealing surface 116 in operation dynamic situation, which indirectly improve the friction performance of the piston ring 110.

As discussed above, there are various operational modes of pressure balance seals 110 and 400, and there are multiple scenarios that fit the descriptions presented above which will occur readily to those skilled in the art, and are included within the scope and spirit of the present invention. Such operational modes provide several advantages. For example, use of a split piston ring design as illustrated in FIG. 4 allows a horizontal mounting of the rotor. More specifically, by using a piston ring design composed by two halves, it is possible to allow the assembly of the rotor on stationary gas and steam turbine applications. In order to minimize the leakage between the two piston ring halves, an overlap of the design is considered. Additionally features to prevent the rotation of the two seal halves are also proposed. The proposed piston ring concepts reduce the friction forces occurring between the piston ring and the piston surface, by achieving a pressure balance in the piston ring. The reduction of the friction forces in the ring, which may serve as a secondary seal on a non-contact face seal, leads to an improvement of the dynamic response of the primary seal.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

The invention claimed is:

1. A pressure balance seal positioned within an annular cavity of a stator comprising a first stator element and a second stator element, the pressure balance seal comprising:
   a sealing surface facing an inward radial direction;
   a stator interface comprising at least one surface interfacing with the stator;
   a friction reducing feature comprising a cavity on the sealing surface, the cavity configured to receive a fluid, such that a normal force acting on the pressure balance seal is counterbalanced by a force generated by a pressure of the fluid, wherein the friction reducing feature permits a fluid to move from at least one higher pressure region adjacent to at least one portion of the stator interface to at least one lower pressure region adjacent to the sealing surface, and thereby reduce the normal force on the pressure balance seal; and
   a profile created on the pressure balance seal, the profile configured to reduce a possibility of twisting of the pressure balance seal.

2. The pressure balance seal of claim 1, wherein the profile comprises a chamfer created on the edge of a first surface and a back surface.

3. A pressure balance seal positioned within an annular cavity of a stator comprising a first stator element and a second stator element, the pressure balance seal comprising:
   a sealing surface facing an inward radial direction;
   a stator interface comprising at least one surface interfacing with the stator;
   a friction reducing feature comprising a cavity on the sealing surface, the cavity configured to receive a fluid, such that a normal force acting on the pressure balance seal is counterbalanced by a force generated by a pressure of the fluid, wherein the friction reducing feature permits a fluid to move from at least one higher pressure region adjacent to at least one portion of the stator interface to at least one lower pressure region adjacent to the sealing surface, and thereby reduce the normal force on the pressure balance seal; and
   a projection extending normally to a second surface, the projection configured to reduce a possibility of twisting of the pressure balance seal.

4. A pressure balance seal positioned within an annular cavity of a stator comprising a first stator element and a second stator element, the pressure balance seal comprising:
   a multi-section ring comprising a half first seal element extending over a half second seal element with a pre-designed overlap, wherein the multi-section ring comprises
      at least one anti-rotation feature configured to arrest relative rotation of the pressure balance seal and the annular gap between the first stator element and the second stator element,
      a sealing surface facing an inward radial direction,
      a stator interface comprising at least one surface interfacing with the stator; and
      a friction reducing feature comprising a cavity on the sealing surface, the cavity configured to receive a fluid, such that a normal force acting on the pressure balance seal is counterbalanced by a force generated by a pressure of the fluid.

5. The pressure balance seal of claim 4, wherein the at least one anti-rotation feature comprises a retainer slot and a retainer projecting from the stator to prevent rotation of the multi-section ring with respect to the stator.

6. A turbine comprising a non-contact face seal assembly comprising:
   a stator comprising a first stator element and a second stator element having an annular gap therebetween; and
   a piston ring positioned within the annular gap, and comprising
      a sealing surface facing an inward radial direction;
      a stator interface comprising at least one surface interfacing with the stator; and
      a friction reducing feature comprising a cavity on the sealing surface, the cavity configured to receive a fluid, such that a normal force acting on the piston ring is counterbalanced by a force generated by a pressure of the fluid.

7. The turbine of claim 6 wherein the friction reducing feature permits a fluid to move from at least one higher pressure region adjacent to at least one portion of the stator interface to at least one lower pressure region adjacent to the sealing surface, thereby reducing the normal force on the piston ring resulting in reduced friction between the piston ring and a piston moving in an axial direction.

8. The turbine of claim 6, wherein the piston ring comprises a full ring segmented at least once, or a multi-section ring.

9. The turbine of claim 8, wherein the multi-section ring comprises a half first seal element extending over a half second seal element with a pre-designed overlap.

10. The turbine of claim 8, wherein the multi-section ring comprises at least one anti-rotation feature configured to arrest relative rotation of the piston ring and the annular gap between the first stator element and the second stator element.

11. The turbine of claim 10, wherein the at least one anti-rotation feature comprises a retainer slot and a retainer projecting from the stator to prevent rotation of the multi-section ring with respect to the stator.

12. The turbine of claim 6 wherein the piston ring comprises a multi-section ring with each section of the multi-section ring including a respective sealing surface, and a respective cavity, with the respective cavities comprising discrete cavities.

13. The turbine of claim 6, wherein the friction reducing feature further comprises at least one through-hole extending through the piston ring to provide fluid from the at least one higher pressure region to a region proximate to the sealing surface.

14. The turbine of claim 13, wherein the friction reducing feature further comprises the cavity in shape of a groove on the sealing surface.

15. The turbine of claim 14, wherein the through-hole extends between the groove and a back surface of the stator interface.

16. The turbine of claim 14, wherein the through-hole extends between the groove and a second surface of the piston ring, the second surface having an interface with the second stator element.

17. The turbine of claim 14, wherein the through-hole extends between the groove and a profile created on the edge of a back surface and a first surface of the piston ring, the first surface having an interface with the first stator element.

18. The turbine of claim 7, wherein the cavity is enclosed by a continuous boundary along the sealing surface, the continuous boundary surrounding the cavity configured to contact the piston at least partially during operation.

19. The turbine of claim 6, wherein the friction reducing feature comprises at least one notch extending along the surface of the piston ring to provide fluid from the higher pressure region to a region proximate to the sealing surface.

20. The turbine of claim 19, wherein the notch extends from the sealing surface to a second surface.

21. The turbine of claim 6, further comprising a profile created on the piston ring, the profile configured to reduce a possibility of twisting of the piston ring.

22. The turbine of claim 21, wherein the profile comprises a chamfer created on the edge of a first surface and a back surface.

23. The turbine of claim 6, further comprising a projection extending normally to a second surface, the projection configured to reduce a possibility of twisting of the piston ring.

* * * * *

UNITED STATES PATENT AND TRADEMARK OFFICE
CERTIFICATE OF CORRECTION

PATENT NO. : 8,430,628 B2  
APPLICATION NO. : 12/630886  
DATED : April 30, 2013  
INVENTOR(S) : Turnquist et al.

Page 1 of 1

It is certified that error appears in the above-identified patent and that said Letters Patent is hereby corrected as shown below:

In the Specification

In Column 3, Line 21, delete "140," and insert -- 106, --, therefor.

In Column 3, Line 60, delete "118" and insert -- 104 --, therefor.

In Column 4, Line 41, delete "sealing surface 120," and insert -- sealing surface 116, --, therefor.

In Column 6, Line 13, delete "first surface 116" and insert -- first surface 114 --, therefor.

In Column 6, Line 21, delete "140" and insert -- 110 --, therefor.

In the Claims

In Column 7, Line 67, in Claim 4, delete "stator;" and insert -- stator, --, therefor.

Signed and Sealed this  
Sixteenth Day of July, 2013

Teresa Stanek Rea  
*Acting Director of the United States Patent and Trademark Office*